United States Patent
Zhang et al.

(10) Patent No.: US 10,571,870 B2
(45) Date of Patent: Feb. 25, 2020

(54) INTELLIGENT CONTROL METHOD AND SYSTEM, AND INTELLIGENT MONITORING SYSTEM

(71) Applicant: BOE TECHNOLOGY GROUP CO., LTD., Beijing (CN)

(72) Inventors: Yong Zhang, Beijing (CN); Wenbo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/936,855

(22) Filed: Mar. 27, 2018

(65) Prior Publication Data
US 2019/0064753 A1  Feb. 28, 2019

(30) Foreign Application Priority Data
Aug. 30, 2017 (CN) .......................... 2017 1 0770536

(51) Int. Cl.
G05B 13/02 (2006.01)
A01G 7/04 (2006.01)
A01G 7/02 (2006.01)
G05B 6/02 (2006.01)

(52) U.S. Cl.
CPC .......... *G05B 13/0265* (2013.01); *A01G 7/02* (2013.01); *A01G 7/045* (2013.01); *G05B 6/02* (2013.01)

(58) Field of Classification Search
None
See application file for complete search history.

(56) References Cited

U.S. PATENT DOCUMENTS

| 7,660,698 | B1* | 2/2010 | Seelig ...................... G01B 7/10 324/207.2 |
| 2009/0271340 | A1* | 10/2009 | Schneegass ........ G05B 13/0265 706/12 |
| 2015/0282440 | A1* | 10/2015 | Shelor ...................... A01G 9/18 47/17 |
| 2015/0305258 | A1* | 10/2015 | Broutin Farah ....... A01G 22/00 700/90 |
| 2018/0035616 | A1* | 2/2018 | Wagner .................. A01G 7/045 |

FOREIGN PATENT DOCUMENTS

| CN | 105425745 A | 3/2016 |
| CN | 105897901 A | 8/2016 |

OTHER PUBLICATIONS

Carlucho et al., "Incremental Q-learning strategy for adaptive PID control of mobile robots", Mar. 6, 2017, Elsevier, Expert system with applications 80, pp. 183-199.*

* cited by examiner

*Primary Examiner* — Jason Lin
(74) *Attorney, Agent, or Firm* — Foley & Lardner LLP; James F. Ewing; Paul M. H. Pua

(57) ABSTRACT

The present disclosure relates to an intelligent control method and system, and an intelligent monitoring system. One method comprises: acquiring an error value between a monitored parameter and a set parameter of a plant growth environment; adjusting a proportional gain, an integral gain, and a differential gain of a PID controller using a Q-Learning Algorithm; and outputting a control command that minimizes the error value based on the error value and the adjusted proportional gain, integral gain, and differential gain.

13 Claims, 4 Drawing Sheets

US 10,571,870 B2

INTELLIGENT CONTROL METHOD AND SYSTEM, AND INTELLIGENT MONITORING SYSTEM

CROSS-REFERENCE TO RELATED APPLICATIONS

The present application claims the benefit of and priority to Chinese Patent Application No. 201710770536.5 filed on Aug. 30, 2017, the disclosure of which is entirely incorporated herein by reference.

TECHNICAL FIELD

The present disclosure relates to an intelligent control method and system, and an intelligent monitoring system.

BACKGROUND

A plant factory is an advanced stage of modern facility agriculture development and is an high-input, high-tech, and elaborately-equipped production system, which integrates biotechnology, engineering technology and system management and disengages agriculture production from natural ecological constraints. An industrialized agriculture system that annually carries out plant product production as planned is one of fields with greatest vitality and potential that absorb and apply high and new technological achievements in the process of agriculture industrialization, and represents a development direction of future agriculture.

In particular, environmental conditions such as temperature, humidity, illumination, $CO_2$ concentration, nutrient liquid and the like for plant fertility in the plant factory all can be automatically controlled by computers, such that growth of plants can be monitored and adjusted in real time, thereby guaranteeing the plants to be in the most suitable growth environment.

SUMMARY

An aspect of embodiments of the present disclosure provides a method, comprising: acquiring an error value between a monitored parameter and a set parameter of the plant growth environment; adjusting a proportional gain, an integral gain and a differential gain of a PID (proportional-integral-derivative) controller using a Q-Learning Algorithm; and outputting a control command that minimizes the error value based on the error value and the adjusted proportional gain, the adjusted integral gain and the adjusted differential gain.

Another aspect of embodiments of the present disclosure further provides a system, comprising: an acquiring module, configured to acquire an error value between a monitored parameter and a set parameter of the plant growth environment; a processor, configured to adjust a proportional gain, an integral gain and a differential gain of a PID controller using a Q-Learning Algorithm; and the PID controller, configured to output a control command that minimizes the error value based on the error value and the adjusted proportional gain, the adjusted integral gain and the adjusted differential gain.

A further aspect of the present disclosure further provides an intelligent monitoring system, comprising the aforementioned system.

A further aspect of the present disclosure further provides a computer readable storage medium storing instructions thereon, when executed on a terminal device, causes the terminal device to perform the method as described above.

A further aspect of the present disclosure further provides a computer program product, when executed on a terminal device, causes the terminal device to perform the method as described above.

BRIEF DESCRIPTION OF THE DRAWINGS

To illustrate the technical solutions in the embodiments of the present disclosure more clearly, the accompanying drawings used in the description of the embodiments will be briefly introduced below. Obviously, the accompanying drawings described below are merely some embodiments of the present disclosure, and those of ordinary skill in the art may also obtain other drawings according to these accompanying drawings without creative efforts.

DETAILED DESCRIPTION

The technical solutions in the embodiments of the present disclosure are described below with reference to the accompanying drawings in the embodiments of the present disclosure. The described embodiments are merely a part rather than all of the embodiments of the present disclosure. Based on the embodiments of the present disclosure, all other embodiments obtained by those of ordinary skill in the art without creative efforts shall fall within the protection scope of the present disclosure.

Figure 1:
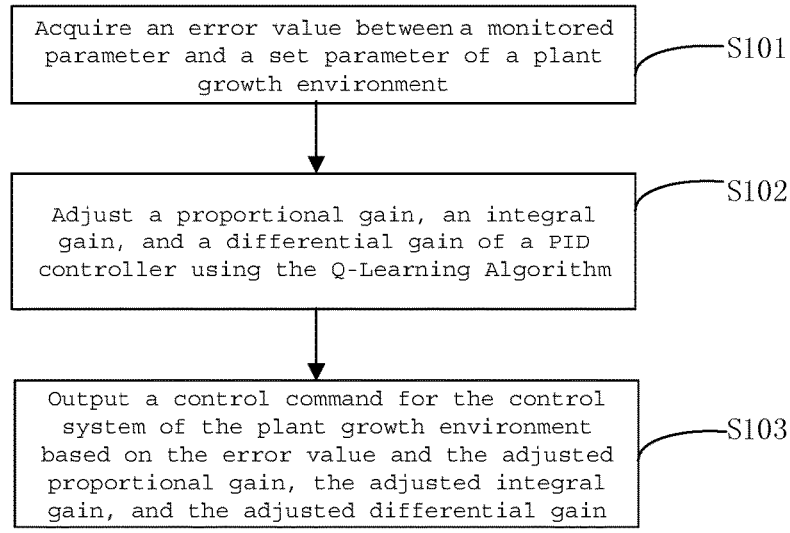
FIG. 1 is a flow chart of an intelligent control method according to embodiments of the present disclosure.

FIG. 1 illustrates a flow chart of an intelligent control method of embodiments of the present disclosure. As shown in FIG. 1, the intelligent control method may comprise the following steps.

Step S101: acquiring an error value between a monitored parameter and a set parameter of the plant growth environment.

For example, the monitored parameters of the plant growth environment may include, but are not limited to, at least one of the following: a monitored temperature value, a monitored humidity value, a monitored $CO_2$ concentration value, a monitored nutrient liquid electrical conductivity (EC) value, a monitored nutrient liquid PH value, or a monitored illumination strength value. Those of ordinary skill in the art may selectively set monitored parameter(s) of the plant growth environment according to actual plant species, demands of plant growth conditions, and the like.

A Type of the set parameter of the plant growth environment may correspond to that of the monitored parameter. For example, the set parameter may include, but are not limited to, at least one of the following: a set temperature parameter, a set humidity parameter, a set $CO_2$ concentration parameter, a set nutrient liquid EC parameter, a set nutrient liquid PH parameter, or a set illumination strength parameter.

Parameter setting may generally include setting an upper limit parameter and setting a lower limit parameter, and a range between the upper limit parameter and the lower limit parameter may be generally the optimal condition of the plant growth environment.

In addition, for parameter setting, the set parameter of the plant growth environment may be either artificially set by the user according to actual demands, or set by selecting them from a plant parameter database. The plant parameter database may be obtained by analysis and sorting according to certain criteria, based on botanical knowledge and expert experiences, thereby enabling users carry out implantation without learning professional implantation knowledge, and thus providing convenient implantation conditions for users.

Step S102: adjusting a proportional gain, an integral gain and a differential gain of a PID controller using a Q-Learning Algorithm.

For example, by using the Q-Learning Algorithm, information (that is, the monitored parameter) may be perceived from an environment. The information is processed, and an optimal action is selected based thereon, that is, the proportional gain, the integral gain, and the differential gain of the PID controller are adjusted accordingly to reach optimization, thereby affecting the environment. That is, the Q-Learning Algorithm can realize an automatic adjustment of parameters by an interaction between a system itself and its environment, and is a continuous "probe-assessment" process.

Step S103: outputting a control command for a control system of the plant growth environment based on the error value and the adjusted proportional gain, the adjusted integral gain and the adjusted differential gain.

For example, the control command u(t) outputted by the PID controller, and the error value e(t) between the monitored parameter and the set parameter of the plant growth environment as well as the proportional gain $k_p$, integral gain $k_i$ and differential gain $k_d$, satisfy the following relational expression:

$$u(t)=k_p e(t)+k_i \int e(t)dt+k_d \dot{e}(t)$$

In practice, based on the error value e(t) between the monitored parameter and the set parameter of the plant growth environment in combination with the gain parameter ($k_p$, $k_i$, $k_d$), the PID controller controls an controlled object by the control command u(t), so as to decrease the error value e(t) as much as possible. In other words, the PID controller outputs a control command that minimizes the error value e(t). For example, the control command is outputted to an adjusting device of the plant growth environment, such that the adjusting device makes an adjustment based on the control command so as to minimize the error value e(t).

To sum up, the present disclosure adaptively adjusts the proportional gain, the integral gain and the differential gain of the PID controller using the Q-Learning Algorithm, thereby guaranteeing the PID controller to output the control command with an optimal gain, so as to cause the plant growth environment to reach an optimal state.

The adjustment of the proportional gain, the integral gain and the differential gain of the PID controller by using the Q-Learning Algorithm in the above step S102 is further illustrated by examples as follows.

For example, a function Q in the Q-Learning Algorithm represents a future value repay obtained by taking a certain action in a certain state. The present disclosure uses the monitored parameter as a state variable and uses a gain as an executed action. Optimal gain parameters are learned in various states (the monitored parameter), and the specific leaning process includes the following.

Start running the Q-Learning Algorithm, which maintains a Q-table to record a Q value under each of executed actions in each of states.

According to the relational expression $$Q(x_t, k_t) \leftarrow Q(x_t, k_t) + \alpha \left[ r_{t+1} + \gamma \max_k Q(x_{t+1}, k_{t+1}) - Q(x_t, k_t) \right],$$

the Q-table in a state at a current time is updated, and an action corresponding to the optimal behavior strategy at the current time is used as an optimized gain $$k_t^* = \arg \max_k Q^*(x_t, k_t)$$

of the PID controller.

In particular, $x_t$ and $k_t$ are a monitored parameter and a gain parameter respectively at the current time; $x_{t+1}$ and $k_{t+1}$ are a monitored parameter and a gain parameter at a next time; $r_{t+1}$ is a reward function when the monitored parameter $x_t$ at the current time is changed to the monitored parameter $x_{t+1}$ at the next time; $\gamma$ is a discount factor; $\alpha$ is a learning rate, $\alpha \in (0,1]$; a gain parameter $k=\{k_p, k_i, k_d\}$, where $k_p$ is the proportional gain, $k_i$ is the integral gain, and $k_d$ is the differential gain.

It should be noted that, the above learning rate $\alpha$ decides an extent to which the newly-obtained information covers old information, namely a coverage extend of information at the current time with respect to information at a previous time. Generally, the learning rate $\alpha$ controls the learning speed, the greater the $\alpha$, the faster the convergence (the monitored parameter converges to the set parameter). However, an excessive $\alpha$ is likely to cause an immature convergence, and thus may be selectively set in practice based on experiences in combination with specifications of a device. In addition, the discount factor $\gamma$ decides a degree of importance for the future repay, and may be also selectively set based on experiences.

In addition, an exemplary computation way of the reward function $r_{t+1}$ is provided below, but the present disclosure is not limited to this.

For example, the reward function $r_{t+1}$ may satisfy the relational expression $$r_{t+1} = -1 + e^{-\frac{(x_{t+1}-x_{ref})^2}{2\sigma^2}},$$

wherein $x_{ref}$ is the set parameter; $\sigma$ is a standard deviation and is determined by the degree of dispersion of the data (the detected parameter) distribution.

Figure 2:
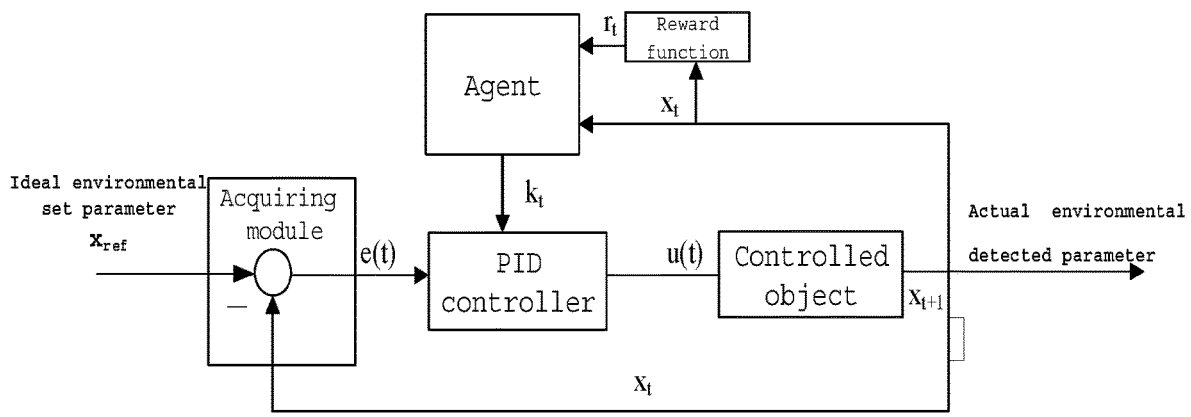
FIG. 2 is a schematic diagram of an intelligent control system according to embodiments of the present disclosure.

FIG. 2 illustrates an exemplary intelligent control system according to embodiments of the present disclosure. As shown in FIG. 2, the intelligent control system may comprise: an acquiring module, an agent (which may be a processor), and a PID controller.

The acquiring module is configured to acquire an error value e(t) between a monitored parameter and a set parameter of a plant growth environment.

The acquiring module acquires the monitored parameter of the plant growth environment from, e.g. a sensor. The monitored parameter of the plant growth environment is monitored by using, e.g. the sensor. The sensor includes, but is not limited to, a temperature sensor, a humidity sensor (e.g., including an air humidity sensor and a soil humidity sensor), a $CO_2$ concentration detecting sensor, an illumination strength sensor, and the like. For example, the $CO_2$ concentration detecting sensor may employ a T6713$CO_2$ sensor, the illumination strength sensor may employ a photosensitive resistance sensor, the air humidity sensor may employ a DHT11 sensor, etc. In practice, a sensor of a corresponding type may be selectively set as desired.

The acquiring module may select the set parameter of the plant growth environment from, e.g. a plant parameter database. This enables users to carry out implantation without learning professional implantation knowledge and provides convenient implantation conditions for users.

The agent is configured to adjust a proportional gain, an integral gain and a differential gain of a PID controller using the Q-Learning Algorithm.

The PID controller is configured to output a control command for a control system of the plant growth environment based on the error value and the adjusted proportional gain, the adjusted integral gain, and the adjusted differential gain so as to minimize the error value.

For example, based on the error value e(t) between the monitored parameter $x_t$ and the set parameter $x_{ref}$ of the plant growth environment in combination with the gain parameter ($k_p$, $k_i$, $k_d$), the PID controller controls a controlled object (for example, the controlled object may be an electronic controllable valve for the humidity control) by the control command u(t), so as to decrease the error value e(t) as much as possible.

The intelligent control system according to embodiments of the present disclosure adaptively adjusts the proportional gain, the integral gain and the differential gain of the PID controller using the Q-Learning Algorithm, thereby guaranteeing the PID controller to output the control command with an optimal gain, thereby causing the plant growth environment to reach an optimal state.

In an actual process of control of the PID controller, an initial proportional gain, an initial integral gain and an initial differential gain for the PID controller may be artificially set, and a subsequent proportional gain, a subsequent integral gain and a subsequent differential gain are adaptively adjusted according to the Q-Learning Algorithm.

In some embodiments, as shown in FIG. 2, the agent adjusts the proportional gain, the integral gain and the differential gain of the PID controller using the Q-Learning Algorithm in the following way.

Start running the Q-Learning Algorithm, which maintains a Q-table to record a Q value under each of executed actions in each of states.

According to the relational expression $$Q(x_t, k_t) \leftarrow Q(x_t, k_t) + \alpha \left[ r_{t+1} + \gamma \max_k Q(x_{t+1}, k_{t+1}) - Q(x_t, k_t) \right],$$

the Q-table in a state at a current time is updated, and an action corresponding to the optimal behavior strategy at the current time is used as an optimized gain $$k_t^* = \arg\max_k Q^*(x_t, k_t)$$

of the PID controller.

In particular, $x_t$ and $k_t$ are a monitored parameter and a gain parameter respectively at the current time; $x_{t+1}$ and $k_{t+1}$ are a monitored parameter and a gain parameter at a next time; $r_{t+1}$ is a reward function when the monitored parameter $x_t$ at the current time is changed to the monitored parameter $x_{t+1}$ at the next time; $\gamma$ is a discount factor; $\alpha$ is a learning rate, $\alpha \in (0,1]$; a gain parameter $k = \{k_p, k_i, k_d\}$, where $k_p$ is the proportional gain, $k_i$ is the integral gain, and $k_d$ is the differential gain.

In some embodiments, the above reward function $r_{t-1}$ satisfies the relational expression $$r_{t+1} = -1 + e^{-\frac{(x_{t+1} - x_{ref})^2}{2\sigma^2}},$$

where $x_{ref}$ is the set parameter; $\sigma$ is a standard deviation.

For other related information of the intelligent control system of the plant factory, related illustrations for the aforementioned method embodiments corresponding to the intelligent control system may be incorporated and not repeated herein.

A practical process of control of the intelligent control system is illustrated by examples as follows.

Step 1, the agent acquires a current state (a current monitored parameter $x_t$), and the system selectively executes an action (a gain $k_t$) which, in combination with the current monitored parameter $x_t$ and the current set parameter $x_{ref}$ (to acquire an error value in the current state), acts on the controlled objects by the PID controller, such that the current state is changed (the monitored parameter will converge toward the set parameter). In an initial state, an action (gain) may be artificially and selectively set according to experiences.

Step 2, the changed state is used as a new current state, that is, a current monitored parameter $x_{t+1}$ at a next time is used as a new current monitored parameter $x_t$. At this time, the system feedbacks a reward function $r_{t+1}$.

Step 3, According to the relational expression $$Q(x_t, k_t) \leftarrow Q(x_t, k_t) + \alpha \left[ r_{t+1} + \gamma \max_k Q(x_{t+1}, k_{t+1}) - Q(x_t, k_t) \right],$$

the Q-Learning Algorithm is run as a whole, the Q-table is updated, the control strategy is adjusted, and an action $$k_t^* = \arg\max_k Q^*(x_t, k_t)$$

corresponding to the optimal behavior strategy acts on the current state by the PID control such that the current state is changed again.

Then, the system reaches a target state (that is, the current monitored parameter is the same as the set parameter) through a process of circularly performing the above step 2 and step 3, and then the circulation ends.

Figure 3:
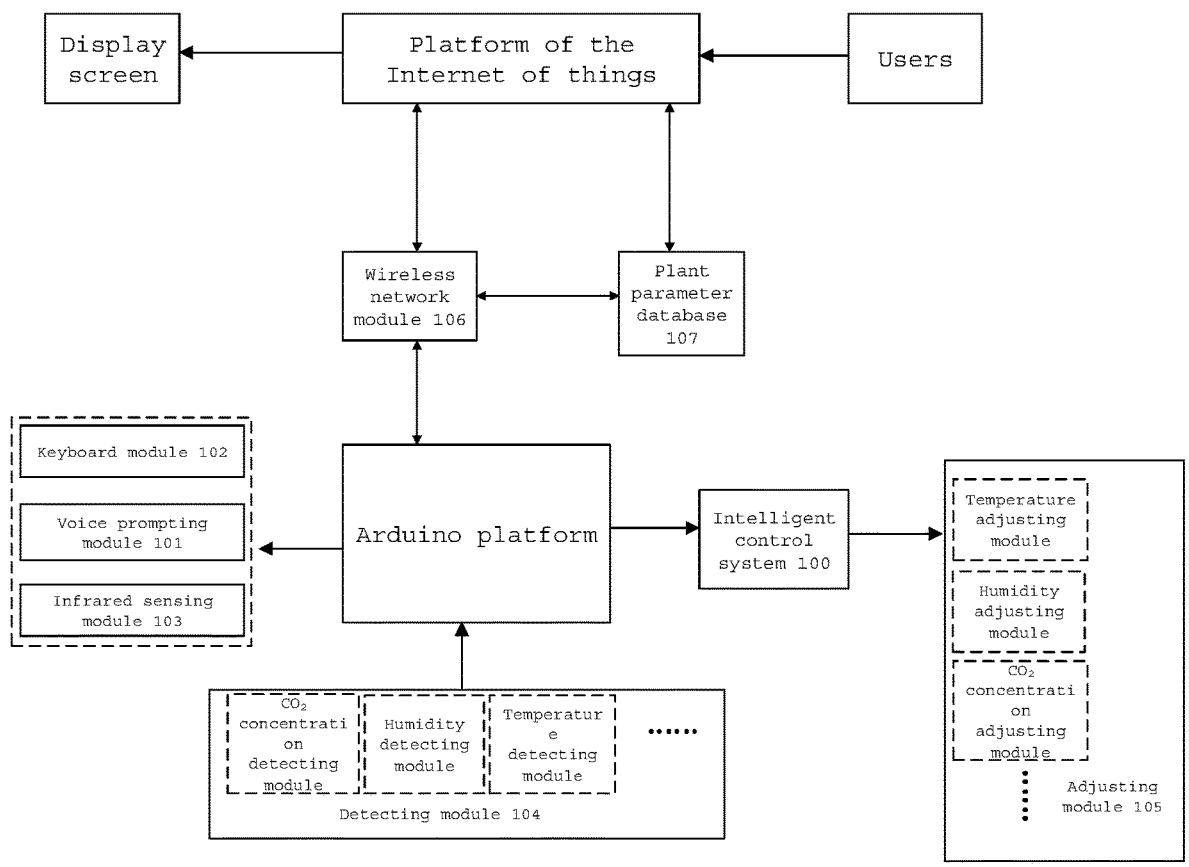
FIG. 3 is a schematic diagram of an intelligent monitoring system according to embodiments of the present disclosure.

FIG. 3 illustrates an exemplary intelligent monitoring system 01 according to embodiments of the present disclosure. As shown in FIG. 3, the intelligent monitoring system 01 comprises an intelligent control system 100. The intelligent control system 100 is, e.g. an intelligent control system as shown in FIG. 2.

In some embodiments, the intelligent monitoring system 01 may be an intelligent monitoring system of a plant factory based on an Arduino platform. For example, the intelligent monitoring system of the plant factory may select the Arduino Mega 2560 development board as a microcontroller, which has up to 54 digital input/outputs (I/O) and is suitable for programs having a large number of I/O interfaces. The Arduino microcontroller may output a detected value of each sensing module to the intelligent control system 100. The intelligent control system 100 may output a control command such that an adjusting module 105 makes an adjustment based on the control command, thereby adjusting the growth environment of the plant to an optimal state. For example, the adjusting module 105 makes an adjustment based on the control command to minimize the error value. The intelligent control system 100 may acquire a related set parameter from a plant parameter database 107 by the Arduino microcontroller.

In some embodiments, the adjusting module 105 may comprise a temperature adjusting module (e.g. a heating rod), a humidity adjusting module (e.g. a spray humidifier), a $CO_2$ concentration adjusting module (e.g. a ventilation fan), and the like. The adjusting process may be, e.g. adjusting the temperature and/or humidity to make it fall within a set range; adjusting to a most suitable $CO_2$ concentration on a basis of achieving the adjustment and control of the temperature and/or humidity; researching an effect on plant growth by illumination, and finding a most suitable illumination ratio; after obtaining all the control factors, observing the plant growth state by a comprehensive adjustment and control of the related parameter.

As shown in FIG. 3, the intelligent monitoring system 01 may further comprise: a voice prompting module 101, an infrared sensing module 103, and a detecting module 104. The voice prompting module 101 is configured to make a voice prompt according to the information about the plant growth environment as detected by the infrared sensing module 103 and the detecting module 104. The detecting module 104 may comprise a temperature detecting module, a humidity detecting module, a $CO_2$ concentration detecting module, etc.

In some embodiments, the voice prompting module 101 (e.g. a SYN7318 voice prompting apparatus) is configured to make a voice prompt according to the environmental information. For example, in case where a temperature value as detected by the temperature detecting module in the detecting module 104 exceeds a range of the set parameter as described by plant for temperature, the voice prompting module 101 may issue an alarm voice prompt. In another example, when users input a related set parameter, the voice prompting module 101 may perform a corresponding voice instruction, such as "Welcome to use the present system, and please input upper limit and lower limit parameters of temperature adaptive for plant growth". In a further example, in case where the infrared sensing module 103 detects that someone is close to plant, the voice prompting module 101 may issue a voice prompt to the person (e.g. say hello, or broadcast related plant growth situations in accordance with the setting), or the like. By providing a human-machine interactive function by the voice prompting module 101, the practicability and interest of the system may be enhanced. In addition, a 4*4 keyboard module 102 may be further arranged to set a temperature, a humidity, an illumination strength range and the like adaptive for plant growth.

As shown in FIG. 3, the intelligent monitoring system 01 may further comprise a wireless network module 106 capable of enabling a communication between the plant factory and users. Combining an emerging idea of the Internet of Things, the Arduino microcontroller may upload a detected value of each sensing module to a platform of the Internet of Things by using the wireless network module 106 such as a Wi-Fi module (e.g., Ethernet Shield W5100). Users may remotely access the platform through software (e.g. a mobile application (APP), but not limited to this), keep eyes on plant growth situations and environmental parameters, and modify related parameters, so as to realize remote control for plant growth. In some embodiments, a separate display apparatus may be further arranged to display current plant growth situations and environmental parameters, such that users can intuitively understand plant growth situations.

Figure 4:
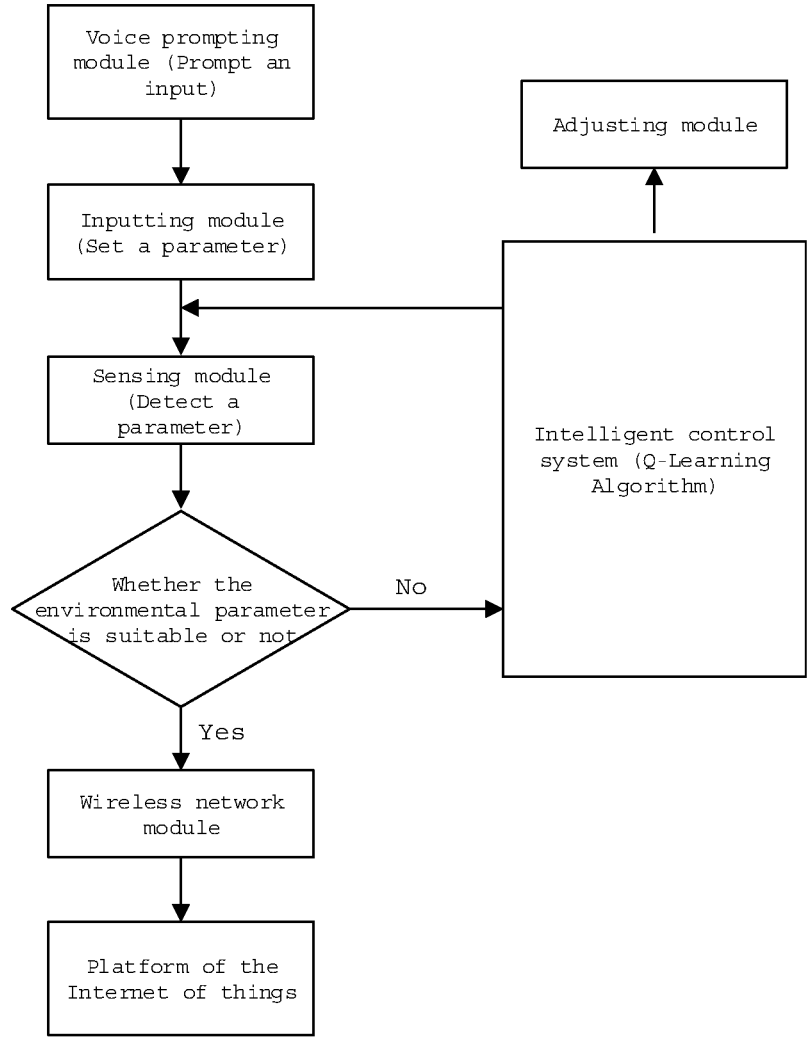
FIG. 4 is a schematic diagram of an intelligent monitoring method according to embodiments of the present disclosure.

FIG. 4 illustrates an exemplary intelligent monitoring method performed by an intelligent monitoring system according to embodiments of the present disclosure.

As shown in FIG. 4, for example, the voice prompting module issues, upon power on, a voice prompt "Welcome to use the present system, and please input environmental (temperature/humidity) upper limit and lower limit parameters adaptive for plant growth". Users set the parameter (i.e. the set parameter) by an inputting module. Alternatively, users may make a selection from the plant parameter database based on plant species and a current season. The sensing module acquires an environmental detected parameter. The system determines whether the environmental parameter is suitable or not. If not, the adjusting module is controlled by the intelligent control system to adjust environment. When the environmental parameter becomes suitable, the parameter is transmitted by the wireless network module to the platform of the Internet of Things. In some embodiments, in case where the environmental parameter is not suitable, the real-time environmental parameter may be also transmitted to the platform of the Internet of Things, which is merely an example here.

Figure 5:
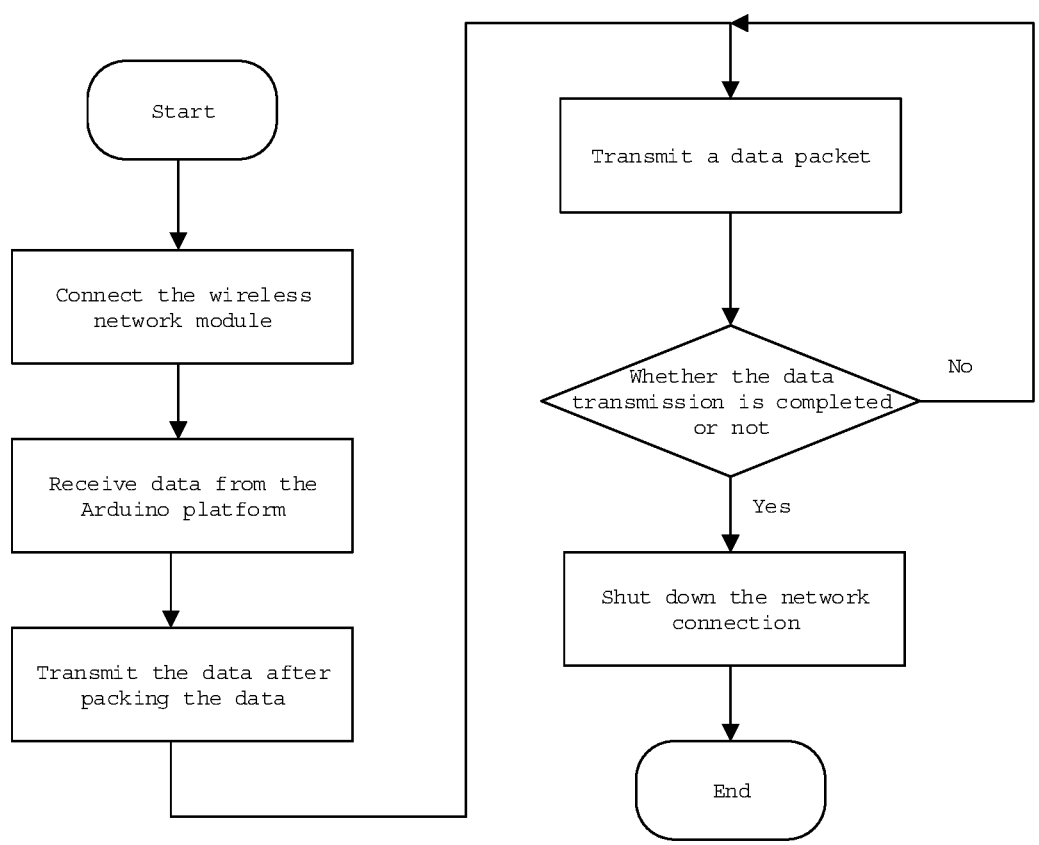
FIG. 5 is a schematic diagram of a data transmission process in an intelligent monitoring system according to embodiments of the present disclosure.

FIG. 5 illustrates an exemplary method of the data transmission performed by a wireless network module (e.g. wireless network module 106 in FIG. 4) according to embodiments of the present disclosure.

As shown in FIG. 5, the power on precedes connecting the wireless network module, receiving data from the Arduino platform, and then transmit the data after packing the data; determining whether the data transmission is completed or not after transmitting a data packet, and if not, continuing to transmit a data packet; if yes, shutting down the network connection; and ending the data transmission.

It should be noted that, in the present disclosure, each module, agent, PID controller and similar terms mean various combinations of any suitable one or more of the following: a specific application integrated circuit, and an electronic circuit; a central processing unit (e.g. a microprocessor) that executes one or more software or fixed programs, and a related internal storage and memory; a combined logic circuit, and an input/output circuit, etc.

Embodiments of the present disclosure further provide a computer-readable storage medium in which instructions are stored. When the instructions are executed on a terminal device, the terminal device is caused to perform the aforementioned intelligent control method.

Embodiments of the present disclosure further provide a computer program product containing instructions. When the computer program product is executed on the terminal device, the terminal device is caused to perform the aforementioned intelligent control method. For example, the computer program product is, e.g. a mobile APP product, etc.

Those of ordinary skill in the art may understand that, all or part of steps that implement the aforementioned method embodiments may be completed by program instructions-related hardware. The aforementioned program may be stored in a computer-readable storage medium. When the program is executed, step(s) including the aforementioned method embodiments are performed. The aforementioned storage medium includes: ROM, RAM, a disk, an optical disk or various medium that may store program codes.

All the above are merely particular implementations of the present disclosure, but the protection scope of the present disclosure is not limited to this. Within the technical scope as revealed in the present disclosure, any of those skilled in the art may readily conceive that any change or alternative should be covered by the protection scope of the present disclosure. Therefore, the protection scope of the present disclosure should be in line with the protection scope of claims.

What is claimed is:

1. A method, comprising:
acquiring an error value between a monitored parameter and a set parameter of a plant growth environment;
adjusting a proportional gain, an integral gain, and a differential gain of a proportional-integral-derivative controller (PID) controller using a Q-Learning Algorithm; and
outputting a control command that minimizes the error value based on the error value and the adjusted proportional gain, the adjusted integral gain, and the adjusted differential gain,
wherein the adjusting the proportional gain, the integral gain, and the differential gain of the PID controller using the Q-Learning Algorithm comprises:
updating a Q-table in a state at a current time according to a relational expression $$Q(x_t, k_t) \leftarrow Q(x_t, k_t) + \alpha \left[ r_{t+1} + \gamma \max_k Q(x_{t+1}, k_{t+1}) - Q(x_t, k_t) \right],$$

and using an action corresponding to an optimal behavior strategy at the current time as an optimized gain $$k_t^* = \arg\max_k Q^*(x_t, k_t)$$

of the PID controller;
wherein, $x_t$ and $k_t$ are respectively a monitored parameter and a gain parameter at the current time,
$x_{t+1}$ and $k_{t+1}$ are respectively a monitored parameter and a gain parameter at a next time,
$r_{t+1}$ is a reward function when the monitored parameter $x_t$ at the current time is changed to the monitored parameter $x_{t+1}$ at the next time,
$\gamma$ is a discount factor,
$\alpha$ is a learning rate, $\alpha \in (0,1]$, and
a gain parameter is $k=\{k_p, k_i, k_d\}$, where $k_p$ is the proportional gain, $k_i$ is the integral gain, and $k_d$ is the differential gain,
wherein, the reward function $r_{t+1}$ satisfies a relational expression $$r_{t+1} = -1 + e^{-\frac{(x_{t+1} - x_{ref})^2}{2\sigma^2}}$$

wherein $x_{ref}$ is the set parameter, and $\sigma$ is a standard deviation of the monitored parameter $x_t$ at the current time.

2. The method according to claim 1, further comprising: selecting the set parameter of the plant growth environment from a plant parameter database.

3. The method according to claim 1, wherein, the monitored parameter of the plant growth environment comprises at least one of the following: a monitored temperature value, a monitored humidity value, a $CO_2$ concentration monitored value, an electrical conductivity value of a nutrient liquid, PH of a nutrient liquid, or an illumination intensity value.

4. The method according to claim 1, further comprising: using the control command to control an adjusting module of the plant growth environment so as to minimize the error value.

5. A non-transitory computer readable storage medium storing instructions thereon, when executed on a terminal device, causes the terminal device to perform the method according to claim 1.

6. A computer program product, comprising a non-transitory computer readable storage medium that stores instructions which, when executed on a terminal device, causes the terminal device to perform the method according to claim 1.

7. A system, comprising:
an acquirer circuitry configured to acquire an error value between a monitored parameter and a set parameter of a plant growth environment;
a processor configured to adjust a proportional gain, an integral gain, and a differential gain of a proportional-integral-derivative (PID) controller using a Q-Learning Algorithm; and
the PID controller, configured to output a control command that minimizes the error value based on the error value and the adjusted proportional gain, the adjusted integral gain, and the adjusted differential gain,
wherein, the processor is further configured to:
update a Q-table in a state at a current time according to a relational expression $$Q(x_t, k_t) \leftarrow Q(x_t, k_t) + \alpha \left[ r_{t+1} + \gamma \max_k Q(x_{t+1}, k_{t+1}) - Q(x_t, k_t) \right],$$

and using an action corresponding to an optimal behavior strategy at the current time as an optimized gain $$k_t^* = \arg\max_k Q^*(x_t, k_t)$$

of the PID controller;
wherein, $x_t$ and $k_t$ are a monitored parameter and a gain parameter respectively at the current time,
$x_{t+1}$ and $k_{t+1}$ are a monitored parameter and a gain parameter respectively at a next time,
$r_{t+1}$ is a reward function when the monitored parameter $x_t$ at the current time is changed to the monitored parameter $x_{t+1}$ at the next time,
$\gamma$ is a discount factor,
$\alpha$ is a learning rate, $\alpha \in (0,1]$, and
a gain parameter is $k=\{k_p, k_i, k_d\}$, where $k_p$ is the proportional gain, $k_i$ is the integral gain, and $k_d$ is the differential gain,
the reward function $r_{t+1}$ satisfies the relational expression $$r_{t+1} = -1 + e^{-\frac{(x_{t+1} - x_{ref})^2}{2\sigma^2}}$$

wherein $x_{ref}$ is the set parameter; $\sigma$ is a standard deviation of the monitored parameter $x_t$ at the current time.

8. The system according to claim 7, wherein, the acquirer circuitry is further configured to select the set parameter of the plant growth environment from a plant parameter database.

9. An intelligent monitoring system, comprising: the system according to claim 7.

10. The intelligent monitoring system according to claim 9, further comprising: a voice prompter circuitry, an infrared sensing module, and a detecting module,
wherein the voice prompter circuitry is configured to make a voice prompt based on environmental information in a plant factory as detected by the infrared sensing module and the detecting module.

11. The intelligent monitoring system according to claim 9, further comprising a wireless network module, configured to enable a communication between the plant factory and users.

12. The intelligent monitoring system according to claim 9, wherein, the acquirer circuitry is further configured to select the set parameter of the plant growth environment from a plant parameter database.

13. The intelligent monitoring system according to claim 9, further comprising an adjuster circuitry, configured to receive the control command and make an adjustment based on the control command to minimize the error value.

* * * * *